2 Sheets--Sheet 1.

H. G. YATES.
Apparatus for Conveying Grain.

No. 144,589. Patented Nov. 11, 1873.

Witnesses:
J. C. Brecht
E. F. Hodges

Inventor:
Henry G. Yates
per atty.
A H & R K Evans

2 Sheets--Sheet 2.

H. G. YATES.
Apparatus for Conveying Grain.

No. 144,589. Patented Nov. 11, 1873.

Witnesses:
T. C. Brecht,
E. F. Hodges.

Inventor:
Henry G. Yates
per attys
A. H. & R. K. Evans.

UNITED STATES PATENT OFFICE.

HENRY G. YATES, OF KALAMAZOO, MICHIGAN.

IMPROVEMENT IN APPARATUS FOR CONVEYING GRAIN.

Specification forming part of Letters Patent No. 144,589, dated November 11, 1873; application filed November 7, 1873.

*To all whom it may concern:*

Be it known that I, HENRY G. YATES, of Kalamazoo, Michigan, have invented a new and useful Improvement in the Mode of Drying and Removing Grain, of which the following is a full, clear, and exact description, reference being had to the accompanying drawings making a part of this specification, in which—

Figure 1:
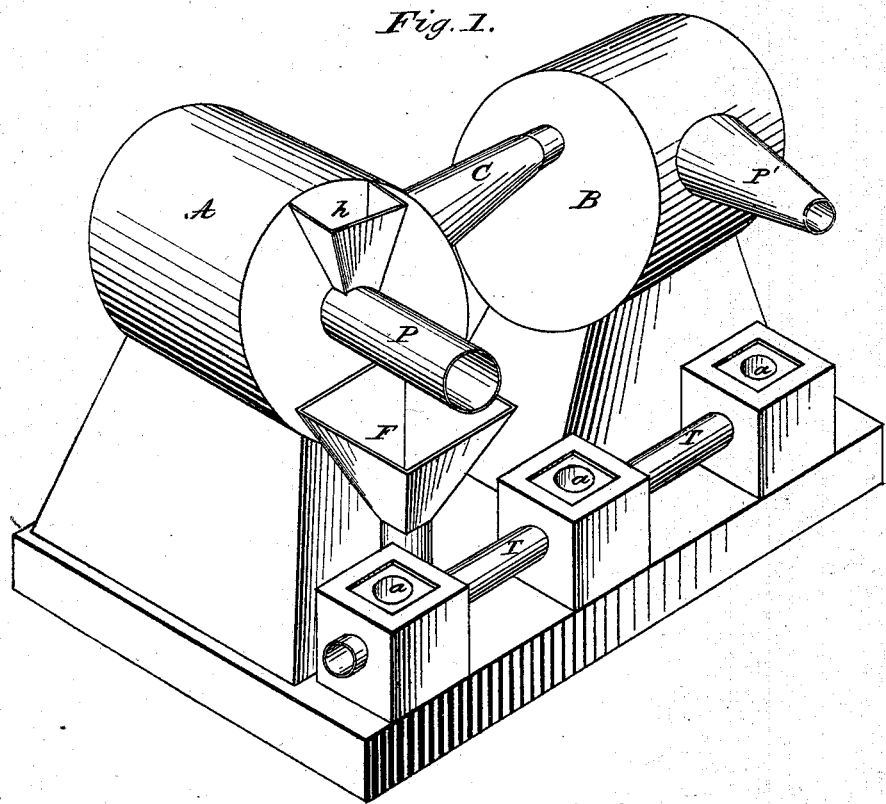
Figure 3:
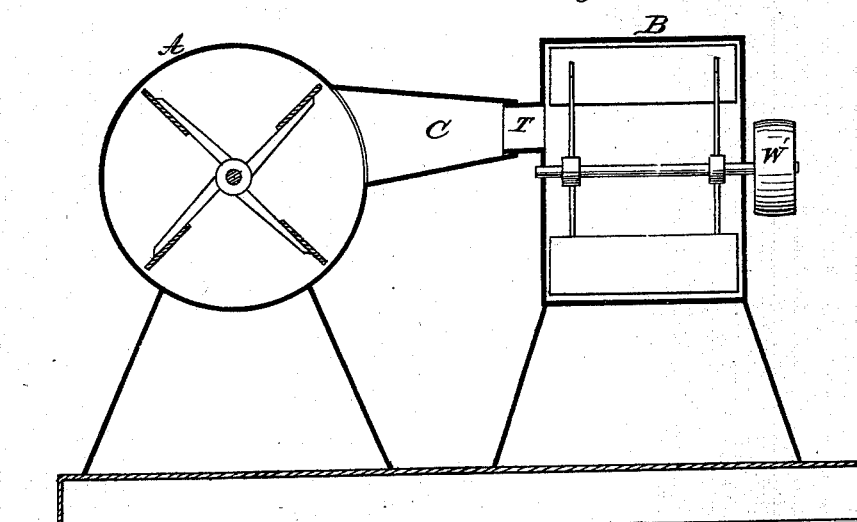
Figure 2:
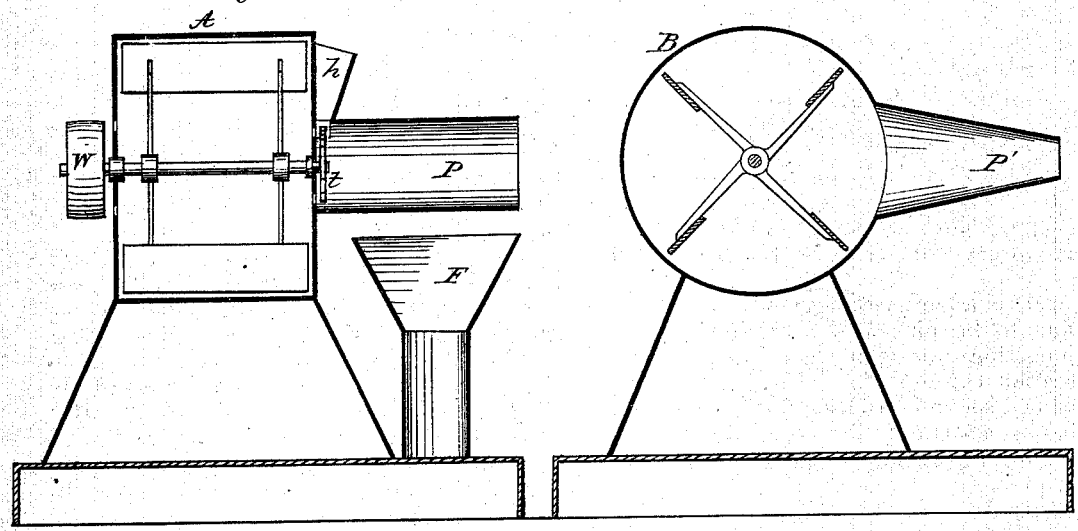
Figure 4:
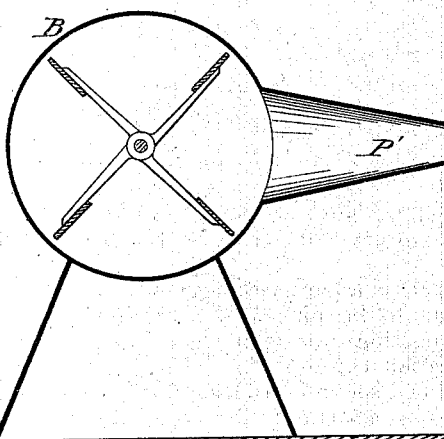
Figure 5:
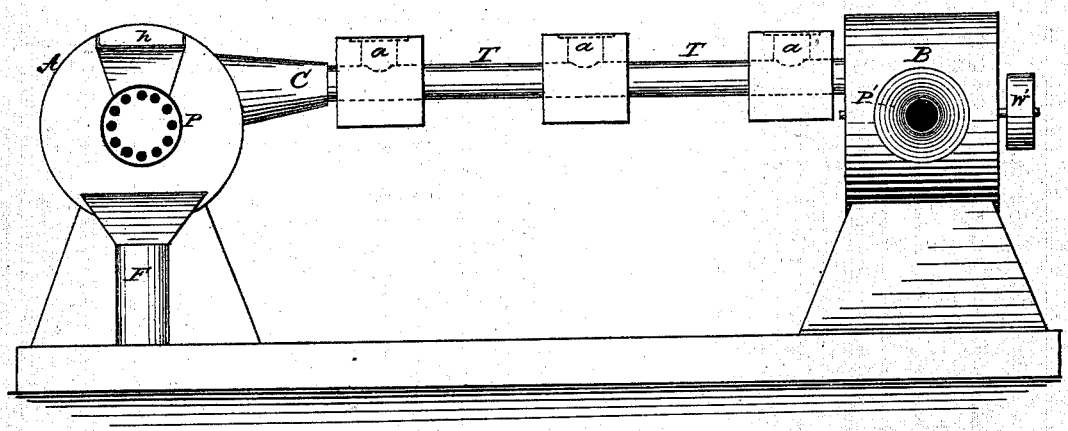

Figure 1 is a perspective view of the cylinders, one to be placed at each station, with the connecting-tube separate. Fig. 2 is a vertical section through the cylinder A. Fig. 3 is a vertical section through the line $y\ y$, Fig. 1. Fig. 4 is a sectional view of the cylinder B. Fig. 5 shows the cylinders attached to the connecting-pipe.

My invention relates to that class of devices intended to dry and remove or transport grain from one point to another; and it consists in the novel combination and arrangement of the several parts, as hereinafter set forth.

To enable others to fully understand and use my invention, I will proceed to describe the exact manner in which I have carried it out.

In the drawings, A is a cylinder, having within it a fan of ordinary construction, to be worked by an engine through the band-wheel W. P is a pipe or tube for the admission of air, which is heated at the moment of its entrance into the cylinder by means of the furnace F, as shown in Fig. 2. On the rear end of cylinder A is arranged the hopper $h$, through which the grain is fed into the cylinder, and where it is brought into direct contact with the current of heated air. The cylinder B, supplied with a fan, which is also worked by an engine through the band-wheel W′, is placed at the point of delivery, and receives the grain thrown from cylinder A and delivers it through the delivery pipe or tube P′. Extending from the forward side of the cylinder A is a short conical-shaped tube, C, which leads into the main connecting-tube T. The flaring mouth of this tube receives the air driven by the fan within the cylinder, and its smaller or contracted exit concentrates the power of the driving force to carry forward the grain which has entered the cylinder through the hopper $h$. After the grain has been carried through the connecting pipe or tube T it enters the cylinder B, where it is subjected to the action of the fan within that cylinder, and is again driven out through the discharge-pipe P′, which is constructed in all respects like the tube C, and which, in a like manner, concentrates the force of the air in the delivery of the grain.

It is evident from what has been stated that the action of the fan in cylinder B will create a vacuum in the main connecting-tube T, and produce what is termed suction, while the fan in cylinder A, receiving its air through the pipe P, will drive the air forward toward the cylinder B unretarded by dead air. In other words, the action of the two fans is to aid and assist each other in moving forward the grain, the one by propulsion and the other by suction.

At convenient points along the main connecting-pipe T are placed the detectors $a\ a$, which are small boxes with glass covers, through which the connecting-pipe passes. At a point within each box an opening is made in the tube, by which means it may be seen if the grain is moving forward properly. In the event of any stoppage of the grain during the operation of the fans, the point of damage or difficulty may be readily detected by an inspection of these boxes.

The furnace F is located as shown in Fig. 2, and may be constructed in any of the well-known forms.

In the bottom of the hopper $h$ is placed a toothed feeder, $t$, which prevents the grain from jamming in the hopper, and secures a regular feed to the cylinder.

It is evident that a system of pumps might be substituted for my cylinders and fans without departing from the spirit of my invention.

Having thus described my invention, what I claim as new, and desire to secure by Letters Patent, is—

The device for drying and removing grain, consisting of the cylinders A B, with their fans, in combination with the tube T, P, and P′ and furnace F, all constructed and arranged substantially as and for the purpose set forth.

H. G. YATES.

Witnesses:
T. C. CONNOLLY,
I. W. COLLAMER.